United States Patent [19]

Nazem et al.

[11] Patent Number: 4,729,689
[45] Date of Patent: Mar. 8, 1988

[54] ELECTRODE MEMBER AND PROCESS FOR THE PRODUCTION THEREOF

[75] Inventors: Faramarz Nazem; Irwin C. Lewis, both of Strongsville; Leonard S. Singer, Berea, all of Ohio; George S. Chryssomallis, Golden Valley, Minn.

[73] Assignee: Union Carbide Corporation, Danbury, Conn.

[21] Appl. No.: 680,995

[22] Filed: Dec. 13, 1984

[51] Int. Cl.⁴ ............................................. H05B 7/14
[52] U.S. Cl. .................................. 403/267; 403/296; 403/DIG. 5
[58] Field of Search ............... 403/267, 266, 265, 296, 403/292, 28, DIG. 5; 156/91, 326, 325; 373/92

[56] References Cited

U.S. PATENT DOCUMENTS

| | | |
|---|---|---|
| 2,093,390 | 12/1934 | Wycokoff . |
| 2,510,230 | 1/1949 | Johnson et al. . |
| 2,692,205 | 10/1952 | Greider et al. . |
| 2,862,748 | 2/1956 | Bailey et al. . |
| 3,140,967 | 7/1964 | Kaufmann et al. .................. 403/267 |
| 3,251,926 | 5/1966 | Click et al. ................... 403/DIG. 5 |
| 3,429,759 | 6/1963 | Kellar et al. . |
| 3,657,592 | 4/1972 | Kellar . |
| 3,884,840 | 5/1975 | Romanski et al. . |
| 4,152,533 | 5/1979 | Gazda ........................... 403/DIG. 5 |
| 4,208,149 | 6/1980 | Bowman . |
| 4,395,299 | 7/1983 | Riggs et al. . |

FOREIGN PATENT DOCUMENTS 877352 3/1959 United Kingdom .

Primary Examiner—Randolph A. Reese
Assistant Examiner—Peter M. Cuomo
Attorney, Agent, or Firm—James L. Sonntag

[57] ABSTRACT

An electrode member comprising an electrode body having cementing pitch adhered to and impregnated within at least a portion of its electrode joint surface. Also a process for producing an electrode joint comprising applying a cement which is a solution/slurry of cementing pitch in nonaqueous organic solvent to at least a portion of the mating surfaces of such electrode joint.

11 Claims, 3 Drawing Figures

ELECTRODE MEMBER AND PROCESS FOR THE PRODUCTION THEREOF

FIELD OF THE INVENTION

This invention is directed to an electrode member for incorporation into an electrode column joint, which electrode member has cementing pitch adhered to and impregnated within at least a portion of its at least one electrode joint surface. This electrode member is prepared by the application of a cement which is a solution/slurry of cementing pitch in nonaqueous organic solvent.

BACKGROUND OF THE INVENTION

Frequently, devices which utilize electrodes composed of materials such as carbon and/or graphite are employed for substantial periods of continuous operation. Typically, in many of these devices, such as arc furnaces employed to melt scrap in the steel industry, the electrode is consumed from its tip because of sublimation or for other reasons, such as scrap caving or vibrational stress. As there are constraints as to the length such electrodes may be fabricated, shipped and/or employed, there have been developed electrode segments comprising electrode members and having mating surfaces. These electrode segments are added to the top of the electrode column by the device operator when consumption of the electrode column has occurred to a specified extent. Typically, mechanical means such as threaded pins are employed to join such electrode segments into the electrode column.

However, during operation of the device, the electrode column is frequently subjected to tremendous mechanical vibrations and thermal shocks as well as to strong electromagnetic fields. The stresses created by such shocks, vibrations and electromagnetic field forces may cause the electrode column to disassemble at the electrode segment joints, even where threaded pins are employed. Such disassembly may occur in consequence of either pin and socket breakages or may result from the unscrewing of one electrode segment from a second electrode segment.

To overcome this problem of electrode joint disassembly, it has been proposed in the prior art to cement the pin to the sockets in order to increase the contact surfaces between the pin and the sockets, and to provide a more uniform distribution of stresses in the joint area.

Thus, for example, U.S. Pat. No. 2,510,230 shows an electrode joint construction wherein a low softening point (e.g., 85°–115° C.) binder pitch-cement is disposed in reservoirs drilled in the pin. At the elevated temperatures to which the electrode column is subjected, the pitch-cement melts and flows out of the reservoirs to fill in the gaps between the pin and thread sockets. However, several disadvantages are associated with such pitch-cement reservoirs. For example, because of constraints in the joint area, there is no control over the flow and distribution of the pitch on the pin and electrode socket surfaces. Moreover, forming reservoir holes in the end faces of the electrode segments and/or in the pin requires an expensive drilling step and mechanically weakens the joint. Further, because the pitch-cement employed must flow, it must therefore possess a low viscosity. Consequently, such pitch-cement will possess a relatively low Modified Conradson Carbon value and will generate large amounts of volatiles during carbonization.

U.S. Pat. No. 2,862,748 discloses an electrode column having cemented joints wherein a liquifiable carbonizable composition (preferably a coal tar pitch having a softening point of between 60° and 120° C.) fills the pores of the entire surface of a threaded carbon connecting member to a depth represented by from about 10% to 75% of the total available porosity of said member, the unfilled interior pores being filled with a gas. This member is preferably produced by machining it to the general contour of the electrode socket with which it will engage; immersing the premachined carbon body into a coal-tar pitch having a softening point of 60°–120° C. at a temperature of 250° C. under a pressure of 50 psi until 10–75 percent of the total available pores inwardly from the entire surface have become filled with pitch; cooling the impregnated member; and grinding said impregnated member to its final form. Although the use of such an impregnated pin will increase the torque required to break the joint at room temperature by 3 or 4 times, the multiple grinding steps add increased cost to the process, remove all pitch from the surface of the connecting member, and also remove most of the impregnated pitch, thereby only permitting a slight increase in strength. Moreover, such low softening point pitch will produce a relatively large amount of volatiles upon carbonization, thus leaving less carbon to cement the bond between the electrode segments.

U.S. Pat. No. 4,395,299 discloses the use of a mesophase pitch having a softening point above 240° C. and a melting point above 300° C. as an electrode cement. The solid pitch particles are placed at the electrode joint surface and the joint is formed by heating at 700° C. to 3000° C. under 20 to 1000 psig pressure which is normal to the bonding surfaces under a vacuum or in an inert atmosphere. However, problems exist in applying such pitch-cement to the electrode joint as gravity will cause the pitch particles to fall, said particles being neither adhered to nor impregnated within the joint surface. In addition increased costs are encountered in providing the necessary vacuum or inert atmosphere for joint formation.

It would therefore be desirable to have a component for incorporation into an electrode joint, as well as a process for the formation of an electrode joint, which joint exhibits increased strength, and which process is safe and economic.

Accordingly, it is an object of this invention to provide an electrode member for incorporation into an electrode joint, which joint will demonstrate increased strength.

It is another object of this invention to provide a process for producing such an electrode member.

It is yet another object of this invention to provide a process for the production of an electrode joint, which process is economic, safe and which will produce a joint having increased strength.

The foregoing and additional objects will become apparent from the following description and examples and the attached drawing.

DESCRIPTION OF THE INVENTION

In one aspect, the present invention relates to an electrode member for incorporation into an electrode joint, which electrode member comprises at least one electrode body having at least one electrode joint surface adapted to be disposed in mating relationship with a second electrode member: the improvement wherein cementing pitch is adhered to and impregnated within at least a portion of said at least one electrode joint surface.

In another aspect, this invention is directed to a process for the production of an electrode member for incorporation into an electrode joint, which process comprises the steps:
(a) providing a first electrode body having at least one first electrode joint surface adapted to be disposed in a mating relationship with an at least one second electrode joint surface of a second electrode body;
(b) applying to at least one portion of said at least one first electrode joint surface a cement which is a solution/slurry comprised of:
  (i) cementing pitch and
  (ii) nonaqueous organic solvent;
  wherein at least about 2 weight percent of the solution portion of said cement is dissolved pitch; and
(c) drying said cement such that pitch is adhered to and impregnated within the at least one portion of said at least one first electrode joint surface.

In yet another aspect, this invention is directed to a process for the production of an electrode joint, which process comprises the steps:
(a) providing a first electrode body having at least one first electrode joint surface adapted to be disposed in a mating relationship with an at least one second electrode joint surface of a second electrode body;
(b) applying to at least a portion of said at least one first electrode joint surface a cement which is a solution-slurry comprised of:
  (i) cementing pitch and
  (ii) nonaqueous organic solvent;
  wherein at least about 2 weight percent of the solution portion of said cement is dissolved pitch;
(c) drying said cement such that pitch is adhered to and impregnated within the at least one portion of said at least one first electode joint surface;
(d) forming an electrode joint by disposing said first electrode body in contact with a second electrode body having at least one second electrode joint surface, with said at least one joint surface of said first electrode body disposed in a mating relationship with said at least one second joint surface of said second electrode body; and
(e) heating the electrode joint to temperature above the coking temperature of the pitch thereby bonding the mating electrode joint surfaces of said first electrode body and said second electrode body.

As is employed herein the term "electrode body" refers to an electrode entity which possesses at least one electrode joint surface adapted to be disposed in a mating relationship with the electrode joint surface of a second electrode body. The entity comprising the electrode body may comprise a single piece of electrode material, e.g. an electrode segment or a connective segment such as a threaded pin, or it may comprise two or more pieces of electrode material, e.g., an electrode segment which has at least one carbon or graphite pin inserted therein. Preferably, the electrode body comprises an electrode segment with a threaded pin inserted therein.

The electrode body of this invention must be composed of a material which is conductive, possesses a porous surface, and which may be bound by the cementing pitches of this invention. Illustrative of the materials which may be employed are carbon and graphite.

The electrode member of this invention is an electrode body having cementing pitch adhered to and impregnated within at least a portion of its at least one electrode joint surface. Preferably, the entire at least one electrode joint surface is coated and impregnated with such pitch.

As is employed herein, the term "cementing pitch" refers to a pitch having a Modified Conradson Carbon yield of more than about 50 percent, most preferably of more than 60 percent, and either (1) a softening point of between about 150° C. and about 400° C. if such pitch contains less than 5 weight percent solid infusible carbonaceous materials or (2) a softening point of between about 100° C. and about 400° C. if such pitch contains 5 or more weight percent solid infusible carbonaceous materials. Pitches having softening points below those listed above possess too low a carbon yield to adequately bond the electrode bodies together. Pitches having softening points above about 400° C. will not undergo sufficient change during coking to provide adequate bonding. The carbon yield of a particular pitch is determined according to the Modified Conradson Carbon Test as described in C. Karr, Jr., *Analytical Methods for Coal and Coal Products*, Academic Press, Vol. II, p. 521 (1978), ASTM D-189.

The electrode member of this invention is typically prepared as follows. A first electrode body having at least one electrode joint surface adapted to be disposed in a mating relationship with the electrode joint sealing surface of a second electrode body is provided. This first electrode body may comprise a single distinct piece of electrode material (e.g. it may constitute a connective pin or unitary electrode segment) or it may comprise two or more distinct pieces of electrode material (e.g. a connective pin disposed within an electrode segment). In those embodiments wherein the electrode member comprises two or more distinct pieces of electrode material, such pieces are preferably adhered together by a bond formed from the cement composition described below.

At least a portion of the at least one electrode joint surface of the electrode member of this invention has a cement composition applied thereto. This cement composition is a solution/slurry comprised of carbonizable pitch and nonaqueous organic solvent. It is within the scope of this invention to employ cement compositions comprising two or more pitches and/or two or more solvents. The use of such a solution/slurry composition will yield an electrode joint surface which has pitch adhered thereto and impregnated therein upon drying. This is because the pitch in the slurry portion of the cement will become plasticized by the solvent and will consequently adhere to the surface upon drying, and because the pitch in the solution portion of the cement will flow into the pores of the electrode body and become impregnated therein upon drying.

As described above, the carbonizable pitch should exhibit a Modified Conradson Carbon value of more than about 50%, preferably of more than 60%, and should possess a softening point of either (1) between about 150° C. and about 400° C. if it contains less than 5 weight percent infusible carbonaceous materials or (2) between about 100° C. and about 400° C. if it contains 5 or more weight percent infusible carbonaceous materials.

The nonaqueous organic solvent employed should preferably possess a low vapor pressure such that it may be removed without a high temperature drying step. Illustrative of the solvents which may be employed are methylene chloride, toluene, petroleum ether, hexane, pyridine, dimethylnaphthalene, anthracene oil, xylene, benzene, carbon disulfide, dimethylformamide and quinoline, with methylene chloride being the preferred solvent.

The ratio of pitch to solvent is preferably between about 1:2 and about 1:25, most preferably between about 1:5 and 1:10 for most pitch/solvent formulations. The compatability of solvent with pitch must be considered when selecting the solvent for a given pitch. It is important that pitch and solvent are selected so as to provide a solution/slurry in which the solution portion contains at least 2 percent, preferably at least 4 percent, by weight, of pitch. Pitch to solvent ratios of less than about 1:25 by weight are not preferred as such low concentrations of pitch necessitate numerous applications in order to obtain a sufficient quantity of pitch on the electrode surface. Concentrations above 1:2 by weight are not preferred because the cement may become difficult to apply.

The cement solution/slurry of this invention is typically prepared by grinding (e.g., by micro-milling) the pitch to a fine flour, preferably until all the pitch will pass through a 200 Tyler mesh screen, i.e. so that the pitch particles will have an average diameter of less than about 0.003 inch. The solvent is placed in a vessel and is typically moderately stirred before pitch is added. The pitch is preferably added slowly to allow it to be dispersed into the solvent. Once the pitch is completely added to the solvent, the solution/slurry is typically stirred vigorously at room temperature for about one hour.

The cement may be applied to the at least one joint surface of the electrode by any conventional means such as spraying, dipping, painting, and the like. After application of the solution/slurry is complete, the cement is dried, typically by allowing the solvent to evaporate in air at room temperature. The preferred means of drying will vary according to the particular solvent employed, as will be well known to those skilled in the art. Once the cement has dried, the above procedure may be repeated as often as required in order to apply the desired amount of pitch to the surface, i.e., an amount sufficient to bond and to provide good conductivity between the electrode joint surfaces, but not so much as to interfere with the mating of such surfaces.

When applying the cement solution/slurry, care should be taken to ensure that a uniformly thick coating of cement having a generally uniform pitch concentration has been applied.

The electrode member of this invention is typically incorporated into an electrode joint by mating its at least one sealing surface with the at least one sealing surface of a second electrode body. The at least one sealing surface of such second electrode body may or may not have cementing pitch disposed thereon and impregnated therein. Preferably, the mating of the electrode member with such electrode body is such that they are mechanically secured to one another, preferably by means of a threaded pin or the like.

The electrode joint is heated to temperature above the coking temperature of the pitch, typically to above about 500° C. This will cause the cementing pitch to be converted into infusible solid coke resulting in a strong bond between the electrode members. Because the cementing pitch has a comparatively high carbon yield, few volatiles are released during this coking step.

When the electrode member of this invention is employed to form joints in arc furnace electrodes, the initial joint resistance coupled with the high current flow through the column will generally generate sufficient heat to carbonize the bond.

BRIEF DESCRIPTION OF THE DRAWINGS

The present invention will become more apparent from the following description thereof when taken together with the accompanying drawing which is set forth as being exemplary of the present invention and which is not intended to be in any way limitative thereof and wherein.

DETAILED DESCRIPTION OF THE DRAWINGS

Figure 1:
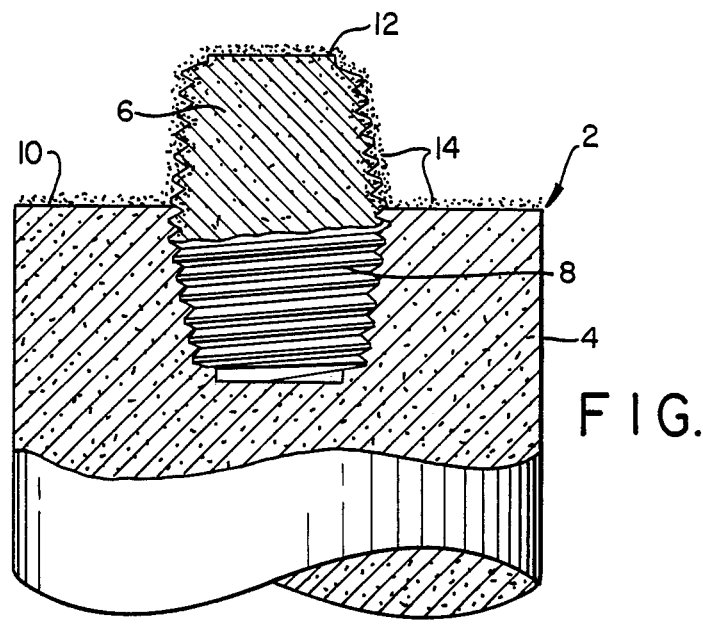
FIG. 1 is a sectional view of a first preferred embodiment of the electrode member of this invention.

Turning now to FIG. 1, there is shown a sectional view of a first preferred embodiment of the electrode member of this invention wherein such electrode member comprises an electrode body consisting of two distinct pieces of electrode material, i.e. an electrode segment and a connecting pin. Electrode member 2 is comprised of electrode segment 4 and pin 6. Pin 6 is preferably composed of the same electrode material (i.e. carbon or graphite) as electrode segment 4, although a graphite pin may be used in conjunction with a carbon electrode segment. Pin 6 is screwed into a socket present in electrode segment 4 by means of threads 8 and is secured within said socket by a coke bond formed by the coking of cementing pitch. The electrode mating surface of electrode member 2, which is comprised of the top surface 10 of electrode segment 4 and the exposed surface 12 of pin 6, has particles of pitch 14 disposed thereon and impregnated therein. Electrode member 2 may be incorporated into an electrode joint by mating such member with a second electrode body having a mating electrode joint surface and heating such assembly above the coking temperature of pitch 14.

Figure 2:
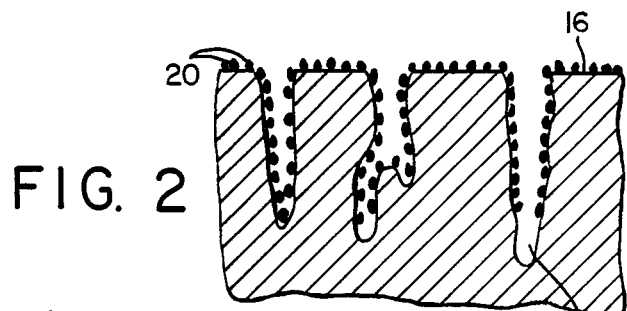
FIG. 2 is an enlarged sectional view of the joint surface of the electrode joint member of FIG. 1.

FIG. 2 shows an enlarged sectional view of a portion of the joint surface of the electrode component of FIG. 1. It is seen that surface 16 having pores 18 has pitch particles 20 adhesively secured to its surface and impregnated within said pores.

Figure 3:
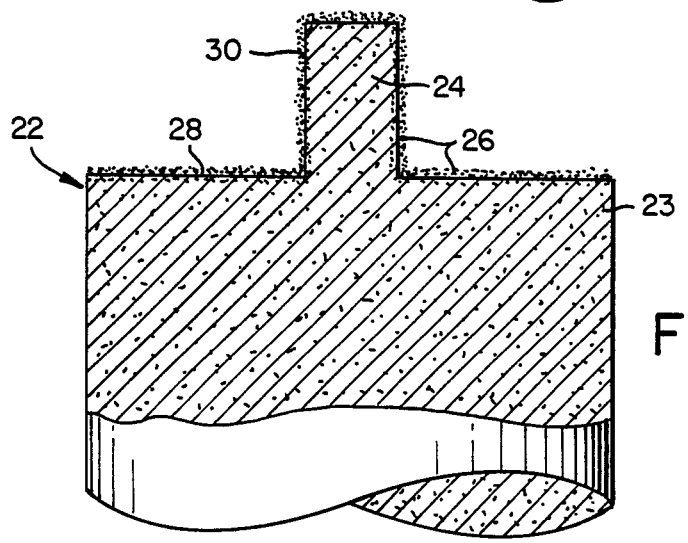
FIG. 3 is a sectional view of a second preferred embodiment of the electrode member of this invention.

FIG. 3 shows a second preferred embodiment of the electrode member of this invention wherein said electrode member comprises an electrode body consisting of a single piece of electrode material. Electrode member 22 includes segment portion 23 and pin extension portion 24 which is an integral part of the electrode member. Pitch particles 26 are adhesively coated to and impregnated within the electrode joint surface which is comprised of top surface 28 of segment portion 23 and exposed surface 30 of pin extension portion 24. Electrode member 22 may be incorporated into an electrode joint by fitting it into an electrode body having a mating electrode joint surface and heating the assembly above the coking temperature of pitch 26.

EXAMPLES

The following examples are illustrative of the present invention and are not intended in any manner to be limitative thereof.

EXAMPLE 1

A coal tar pitch with a softening point of 165° C. and a Modified Conradson Carbon value of 71 percent was ground to a flour using a micro-mill. One hundred grams of the ground pitch, all of which was passed through a 200 Tyler mesh screen, was slowly added to 500 ml of methylene chloride while stirring with a magnetic stirrer, thereby forming a cement solution/slurry. After the addition was complete, the stirring was continued for about one hour at room temperature in order to maximize dissolution of the pitch.

After stirring, the pitch solution/slurry was painted with a brush onto the socket area and end face of four six-inch diameter graphite electrode segments and four threaded connective pins. The pitch slurry was applied uniformly and after application the electrode was allowed to dry in air at room temperature for abut 30–45 minutes. A second application of the pitch was then made and after a second 30–45 minute drying period, a third application was made.

When the third coat of cement had dried, four electrode joints were assembled by screwing one of the coated threaded pins into one of the coated sockets, and mating each of the electrode members formed thereby with untreated electrode segments. This mating was accomplished by screwing the exposed portion of the coated pin into a socket present in said untreated electrode segment until the end faces of the treated and untreated electrode segments were in contact.

After assembly of the joint was complete the electrode joint was cemented by heating it in an induction coil to approximately 1200° C. at the rate of 100° C. per hour with a two hour hold at 1200° C. The cemented joint was then allowed to cool to room temperature.

After cooling, one 13/16-inch diameter anchor hole was drilled into each cemented joint segment so that the electrode joint could be mounted onto an untorquing apparatus to measure the force required for disassembly.

Each electrode joint was mounted in a horizontal position on the untorquing apparatus. The "right hand" side of the joint was kept stationary by bolting at the base of the platform. The other side of the joint received "unscrewing" torque from a lever arm connected to equipment which exerts and measures the torque.

Cement effectiveness is measured in terms of unscrewing torque. The amount of stress required to unscrew or even break the joint was measured in psi and the value was used to calculate the corresponding foot-pounds of torque.

The average unscrewing torque force for the four cemented electrode joints was calculated to measure 1390 foot-pounds. In contrast, an identical electrode joint not having the cement of this invention required a force of less than 100 foot-pounds to disassemble the joint.

EXAMPLE 2

Several electrode joint assemblies were prepared in accordance with the procedure described in Example 1, with each assembly being cemented with a cement composition comprised of 20 parts by weight of a mesophase pitch having a softening point of about 325° C. and a Modified Conradson Carbon value of about 90% in 100 parts by weight the "solvent" listed in Table I below. Three applications of cement were applied to each of four six-inch diameter electrodes and the average disassembly torque calculated as in Example 1. In addition, the concentration of pitch actually dissolved in the solution portion of the cement was determined by filtering the solution slurry to isolate the undissolved portion; drying such undissolved portion; and weighing the solid remaining after such drying. The amount of pitch dissolved is determined by subtracting the weight of the solid from the total initial weight of the pitch added. The calculated results are shown in Table I below.

TABLE I

Solvent Effect on Cement Strength

| Solvent | Percent Concentration of Pitch in Solution (by weight) | Average Disassembly Torque (in foot-pounds) |
|---|---|---|
| water | 0.00 | less than 100* |
| hexane | 0.26 | less than 100* |
| acetone | 0.30 | less than 100* |
| toluene | 1.20 | less than 100* |
| methylene chloride | 4.10 | 256 |
| dimethyl-naphthalene | more than 4 | 1047 |

*Readings of the untorquing apparatus below 100 foot-pounds are imprecise.

The above results indicate that the quantity of pitch actually dissolved in the solvent greatly affects the binding strength of the cement solution/slurry. Accordingly, it is believed that the solution portion of the cement solution/slurry must comprise at least 2 weight percent dissolved pitch in order to ensure that a sufficient quantity of pitch is impregnated within the pores of the electrode joint surface.

EXAMPLES 3—13 AND COMPARATIVE EXPERIMENTS A AND B

Several other electrode joint assemblies were prepared according to the process described in Example 1, with the pitch, ratios of pitch to solvent, number of applications and solvent employed listed in Table II below. The joints were disassembled as in Example 1 and the average disassembly values calculated are listed in Table II below. In Comparative Experiment A, no cement was added to the joint assemblies. In Comparative Experiment B, a pitch that is not a cementing pitch was employed.

In these Examples and Comparative Experiments the following pitch samples possessed the below listed characteristics:

A. Mesophase pitch containing about 80% mesophase with a softening point of about 325° C., a Modified Conradson Carbon value of about 90%, and comprising 0% to infusible carbonaceous solids.

B. Pitch prepared by vacuum distillation of a petroleum pitch, said pitch having a softening point of 171° C. and a Modified Conradson Carbon value of 65%.

C. Pitch prepared by vaccum distillation of petroleum pitch, said pitch having a softening point of 175° C. and a Modified Conradson Carbon value of 64%.

D. Pitch prepared by vacuum distillation of petroleum pitch having a softening point of 198° C. and Modified Conradson Carbon value of about 74%.

E. A coal tar pitch with a 111° C. softening point, a Modified Conradson Carbon value of 57% and comprising 15% infusible carbonaceous solids.

F. A coal tar pitch with a 132° C. softening point, a Modified Conradson Carbon value of 61%, and comprising less than 5% infusible carbonaceous solids.

TABLE II

Joint Cement Results Summary

| Examples | Solvent | Pitch | Number of Applications | Avg. Disassembly Torque (foot-pounds) | Weight Ratio Pitch:Solvent |
|---|---|---|---|---|---|
| A | Control | None | — | less than 100 | — |
| 3 | dimethylnaphthalene | A | 3 | 902 | 1:2 |
| 4 | dimethylnaphthalene | A | 3 | 1047 | 1:5 |
| 5 | methylene chloride | A | 3 | less than 100 | 1:3.3 |
| 6 | methylene chloride | A | 3 | 256 | 1:5 |
| 7 | quinoline | A | 3 | 1700 | 1:2 |
| 8 | methylene chloride | B | 3 | 471 | 1:5 |
| 9 | methylene chloride | C | 3 | 1005 | 1:5 |
| 10 | methylene chloride | C | 1 | 184 | 1:3.3 |
| 11 | methylene chloride | C | 2 | less than 100 | 1:3.3 |
| 12 | methylene chloride | D | 3 | 1247 | 1:5 |
| 13 | methylene chloride | E | 3 | 1226 | 1:5 |
| B | methylene chloride | F | 3 | less than 100 | 1:5 |

The above results indicate that the cement solution/slurry of this invention may be comprised of a variety of solvents and pitches. A comparison of Example 13 with Comparative Experiment B indicates that pitches with melting points below about 150° C. should comprise at least about 5 percent infusible carbonaceous solids. It is believed that the relatively poor results in Examples 5, 10 and 11 result from too large a concentration of pitch in the particular pitch/solvent system employed. It is hypothesized that in these Examples too much pitch was present on the surface and/or too little pitch impregnated within the surface.

Although preferred embodiments of the invention have been described in detail, it is contemplated that modifications thereof may be made and some features may be employed without others, all within the spirit and scope of the invention.

What is claimed is:

1. In an electrode member for incorporation into an electrode joint, which electrode member comprises at least one porous electrode body having at least one electrode joint surface adapted to be disposed in a mating relationship with a second electrode member: the improvement wherein cementing pitch is adhered to and impregnated within at least a portion of said at least one electrode joint surface, wherein said cementing pitch has a carbon yield of more than about 50 percent and includes pitch particles having an average diameter of less than about 0.003 inch.

2. The electrode member of claim 1 wherein the cementing pitch has a carbon yield of greater than about 60%.

3. The electrode member of claim 1 wherein said electrode body comprises a single piece of electrode material.

4. The electrode member of claim 1 wherein the electrode body comprises two or more pieces of electrode material.

5. The electrode member of claim 4 wherein the electrode body comprises an electrode segment and a connective member.

6. The electrode member of claim 1 wherein the electrode body is composed of one material selected from the group consisting of carbon and graphite.

7. An electrode joint comprising at least two porous electrode segments having mating end faces provided with threaded sockets and a threaded connecting pin screwed into each socket; characterized in that a cementing pitch is adhered to and impregnated within at least a portion of one of said end faces and said connecting pin, wherein said cementing pitch has a carbon yield of more than about 50 percent and includes pitch particles having an average diameter of less than about 0.003 inch.

8. The electrode joint of claim 7 wherein the cementing pitch is a coal tar pitch having a softening point of 165° C. and a carbon yield of 71 percent.

9. The electrode joint of claim 7 wherein the cementing pitch is a mesophase pitch having a softening point of about 325° C. and a carbon yield of about 90 percent.

10. The electrode joint of claim 7 wherein the cementing pitch has a softening point of between about 150° C. and about 400° C. when said pitch contains less than 5 weight percent solid infusible carbonaceous materials.

11. The electrode joint of claim 7 wherein the cementing pitch has a softening point of between about 100° C. and about 400° C. when said pitch contains 5 or more weight percent solid infusible carbonaceous materials.

* * * * *